April 25, 1950  W. A. WILLIAMS  2,505,346
FOG DETECTOR FOR X-RAY FILM PACKAGES
Filed Nov. 22, 1946
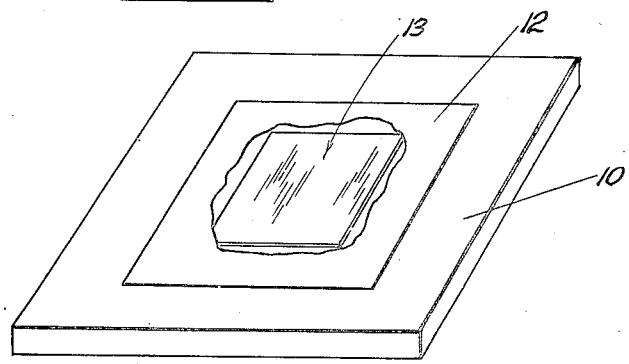
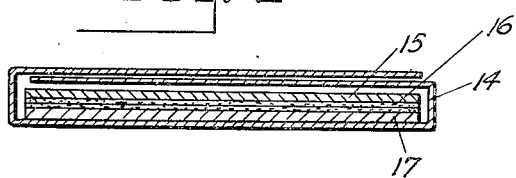
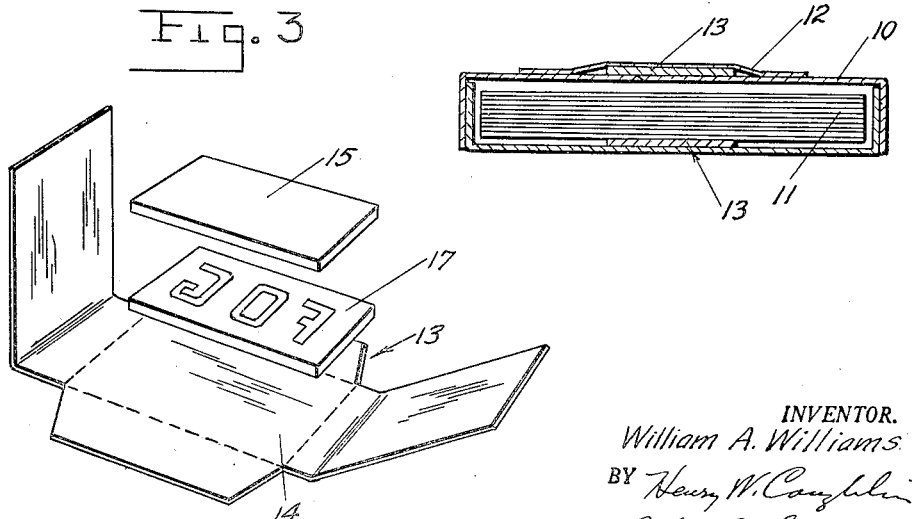
INVENTOR.
William A. Williams
BY
Attorneys Patented Apr. 25, 1950

2,505,346

UNITED STATES PATENT OFFICE 2,505,346

FOG DETECTOR FOR X-RAY FILM PACKAGES

William A. Williams, Port Crane, N. Y., assignor to General Aniline & Film Corporation, New York, N. Y., a corporation of Delaware Application November 22, 1946, Serial No. 711,681

5 Claims. (Cl. 250—67)

This application pertains to an invention in fog indicators for X-ray film and the like.

X-ray film is packaged so that it is completely protected against light from the visible spectrum and against light of wavelengths close to those to be found in the visible spectrum. Obviously, no practical package can be devised which will serve to protect the film against X-rays or other invisible radiation of similar nature. Such film is generally kept in fairly close proximity to X-ray apparatus, and in the case of hospitals, to radium or other radiation emitting material by means of which it may be accidently exposed. Generally, such exposure is not of a nature to completely blacken film upon development, but does greatly detract from the definition of an image which might otherwise be expected.

Since the use of high voltage has become more prevalent in industrial radiography, it has become increasingly difficult to protect film against stray radiation and present types of fog indicators are not nearly as effective under such circumstances as they are when only the softer or less penetrating rays are to be encountered.

Fog indicators have been employed and at present one such indicator comprises a lead foil wrapped about the film package, or contents therein, in such manner as to shield a band of the film against stray radiation or other unintended exposure. For practical reasons, such a foil must be relatively thin and while under normal conditions of fogging film it may work satisfactorily, for extremely penetrating rays of certain types, it may not suitably distinguish to show a fogged condition of the finally exposed and developed radiograph.

Another practical means for indicating fogged film is that of cutting away a part of the package in which the film is contained so that if subjected to stray radiation, the film will be exposed in that area at least to a greater extent than it will be in other areas where the rays must penetrate the package before reaching the film. Such an expedient serves to show fogged film under conditions where the radiation is reasonably soft and where the effect is not later obliterated by the actual image on the film as finally developed. For high voltage equipment or other situations in which extremely hard and penetrating radiation is to be encountered, the shadow cast on the film due to the difference in thickness of a cardboard package is entirely ineffective. It will not show the effect of the greater absorption by the thicker part of the package as against that of the thinner material at the cut-away portion.

According to the invention hereinafter to be described in greater detail, a fog indicator is incorporated in or on packaged film and is of such a nature as to magnify greatly the effect of the stray radiation, either soft or hard X-rays, or other rays such as gamma rays, beta rays, and the like.

Accordingly, it is an object of the present invention to provide a fog indicator which will greatly intensify the exposure due to such stray radiation so that it will be possible upon development and examination of the indicator independently of the packaged film itself, to find out whether or not the package has been subjected to any invisible radiation which would tend to fog the contents thereof.

It is another object of the invention to devise a fog indicator which may remain a part of the package in which the film is contained and which will be extremely inexpensive since it may be made up from scrap film and screen material.

Other objects of the invention will be apparent from the following detailed description and from the figures of drawing, in which:

Fig. 1 is an isometric view of a film package under the label of which a fog detector packet has been placed.

Fig. 2 is a section taken through one type of fog detector packet according to the invention.

Fig. 3 is an exploded view of the packet of Fig. 2.

Fig. 4 is a section taken through a film package to which two fog detector packets have been applied.

Now referring to Figs. 1 and 4, X-ray film is generally packaged in cardboard boxes of rectangular form, such as the box 10, within which a plurality of sheets of film 11 are contained, the said film being wrapped in black, matte paper as is usually employed in wrapping photographic sensitized materials and which is adapted to exclude light from the visible spectrum and wavelengths of light closely adjacent thereto, but which will not exclude X-rays or other normally invisible radiation of penetrating nature. Such a package usually has a label 12 pasted on the top thereof and which carries the usual trade-mark, identification, and other information relative to the contents of the package.

While it is not intended to limit the shape of the fog detector packet, it may preferably be square or rectangular in form and may be of any convenient size, for example, anything from one-half inch to two inches or more square. If desired, such fog detector may be elongated and may pass entirely about the film in the package although that is not necessary according to the principles involved since reliance is not placed upon observing an effect on the film itself which is later to be exposed and processed in the usual manner. Dependence is placed upon observing the condition of a small sheet of film in the packet which must become exposed in the event the package of film is subjected to unintended exposure of any type. Thus, a small piece of film just large enough to be handled readily and to be easily observed after development will suffice.

Preferably, one of the fog detector packets indicated by numeral 13 is to be placed under the label 12 just before that label is pasted in place on the package or box cover. While one such fog detector packet may suffice, another of similar nature may be placed at the bottom or other side of the package and may either be placed under a similar label, or as is more expedient, may merely be inserted in the package under the wrapped film after which the cover of the package may be secured in place, the label 12 and packet 13 at the cover being positioned either before or after that in accordance with convenience during the packaging operation.

Referring more specifically to Figs. 2 and 3, the packet comprises a folded envelope or container 14 in which are enclosed and protected against light from the visible or near visible spectrum, a small sheet of film 15 which is preferably high speed type X-ray film having an emulsion 16 of that type described in "Photographic Emulsion Technique," T. Th. Baker, 1941, page 132, American Photographic Publishing Co., Boston, Massachusetts. Such an emulsion while sensitive to X-rays and other normally invisible radiation, is also highly sensitive to light from the visible spectrum, such as light emitted from a fluorescent material.

In contact with, or at least closely adjacent to the emulsion 16 of the X-ray film is provided a second film 17 having thereon material which will fluoresce when it absorbs X-rays or other normally invisible radiation, for example, alpha rays, beta rays, or the like. While the entire surface of the film 17 may be coated with such a fluorescing substance, it is preferably to coat some design thereon, such as that illustrated in Fig. 3, which after the packet has been subjected to rays which would tend to fog the film contained therein, will impress a latent image of that design on the film 15. Of course, upon development, that image will be brought out so that one may observe the amount of radiation and also the type of radiation to which the package has been subjected, that is, if there has been unintended exposure.

The emulsion 16 may be coated with the fluorescent substance in the event that substance has no deleterious effect upon the emulsion of the film over a prolonged period of time. Preferably, the fluorescent substance is coated on a film base and may be coated on scrap film base, therefore, making it possible to provide a fog indicator at extremely low cost. The film 15 is preferably scrap cuttings of high speed X-ray film and since similar pieces of film base may be employed for the fluorescent screen and the envelope 14 may be stamped from the usual light excluding black paper, the total cost is extremely low. The fact that a packet containing film of about one-half inch in either dimension will suffice also makes it possible to provide adequate means for indicating unintended exposure without materially increasing the cost of the packaged film itself.

One fluorescent material found to work very satisfactorily and which will not have an adverse effect upon the emulsion of the high speed X-ray film 15 is calcium tungstate. Other materials which fluoresce upon being excited with X-radiation, or other similar invisible radiation are the following:

Potassium platinocyanide
Barium platinocyanide
Zinc silicate (willemite)
Calcium sulphide
Fluorspar
Cadmium sulphate
Cadmium tungstate When subjected to radiation which will tend to fog the film, the intensifying effect of the fluorescent screen is such that the exposure effect in the film 15 is many times what might be expected if that radiation were to penetrate the box and selectively expose a part of the X-ray film itself. In the latter event, hard radiation frequently fails to record with sufficient contrast to be detected either when employing the system of cutting away part of the package or shielding with a thin lead strip. After the film has been exposed as it must be to take a latent image over its entire surface prior to being developed, extremely hard or penetrating radiation with which it has been fogged may have such effect that it penetrates the part of the package not cut away to practically the same extent it penetrates the area cut from the package. It likewise may penetrate a thin foil practically as much as it does the package. Therefore, the finished film may show no contrast which would indicate whether or not it had been unintentionally fogged.

According to the invention herein described, highly penetrating radiation is greatly intensified and records on the emulsion of the film 15 in such manner that a very distinct image is produced even though the amount of radiation is relatively small. Soft radiation likewise will be intensified so that if it were possible to penetrate the package and to fog the enclosed film, it would also produce a very pronounced and easily distinguishable mark on the indicator film. As a practical matter, the intensification of the radiation and recording upon high speed film as herein described gives an image of about twenty times as much contrast as would be expected if the same radiation were to penetrate the package and fog the film therein in some selective areas as intended in accordance with the prior art above mentioned.

While the invention as herein described has referred to cut sheets of film packaged in a more or less rectangular box, it is equally applicable to rolls of film or to other type packages. The packet may be included under the label of any package no matter what its shape or may be inserted in the package if that is more convenient. Since intensification of the image gives a recording on the developed film much more dense or of much more contrast as compared to ordinary fog density, the inclusion of the packet inside a relatively heavy package does not impair its efficacy to a noticeable extent.

The terms "visible spectrum," "near visible spectrum," and "normally invisible radiation" or equivalents have been employed. The first of these is self-explanatory. By the term "near visible spectrum" applicant refers to that radiation in the infrared and in the near ultraviolet portions of the spectrum which, although they affect a photographic or radiographic emulsion, may easily be excluded by the usual black paper and package. The term "normally invisible radiation" refers to that radiation of a type adapted readily to penetrate most opaque materials and includes X-rays, alpha rays, beta rays, gamma rays, and other rapidly moving electrons capable of being focused and used for radiographic purposes.

While one embodiment of the invention has been disclosed, it is to be understood that the inventive concept may be carried out in a number of ways. This application, therefore, is not to be limited to the precise details described, but is intended to cover all variations and modifications thereof falling within the spirit of the invention and the scope of the claims.

I claim:

1. The combination with a film package pervious to normally invisible radiation and containing film subject to fogging by such radiation, of a fog indicator positioned to absorb radiation which might enter said package and fog the film therein, comprising a visible light excluding packet pervious to the normally invisible radiation and containing therein a film having an emulsion sensitive to the normally invisible radiation but also highly sensitive to light from the visible spectrum and a coating of fluorescent material adjacent said film emulsion and so disposed as to fluoresce and thereby to expose said emulsion to visible light upon exposure to the said normally invisible radiation.

2. The combination with a film package pervious to normally invisible radiation and containing film subject to fogging by such radiation, of a fog indicator positioned to absorb radiation which might enter said package and fog the film therein, comprising a visible light excluding packet pervious to the normally invisible radiation and containing therein a film having an emulsion sensitive to the normally invisible radiation but also highly sensitive to light from the visible spectrum, and a second film having a fluorescent material coated thereon in accordance wtih a predetermined design, said film emulsion and fluorescent material being retained in said packet in such mutual disposition that said fluorescent coating when excited by invisible radiation, will emit visible light thereby to expose said emulsion along with that exposure incidental to the invisible radiation itself.

3. The combination with a film package pervious to normally invisible radiation and containing film subject to fogging by said radiation, of a fog indicator positioned to absorb radiation which might enter said package and fog the film therein, comprising a visible light excluding packet pervious to the normally invisible radiation and containing therein a film coated with an emulsion sensitive to the normally invisible radiation and also highly sensitive to light from the visible spectrum, an intensifying screen comprising a base and fluorescent material coated thereon disposed adjacent said film emulsion so that upon being excited by invisible radiation penetrating said packet, the said material will fluoresce thereby to expose said emulsion with visible light in addition to the effect thereon incidental to the said invisible radiation itself.

4. A fog detector for insertion in or attachment to a film package, including a packet pervious to normally invisible radiation but impervious to light from the visible spectrum and those wavelengths of light closely adjacent thereto, a film contained within said packet and having an emulsion coated thereon sensitive to the normally invisible radiation but also highly sensitive to light from the visible spectrum and a coating of fluorescent material adjacent said film emulsion and so disposed as to fluoresce and thereby to expose said emulsion to visible light upon exposure to the said normally invisible radiation.

5. A fog detector for insertion in or attachment to a film package including a packet pervious to normally invisible radiation but impervious to light from the visible spectrum and to those wavelengths of light closely adjacent thereto, said packet containing therein a film having an emulsion sensitive to the normally invisible radiation but also highly sensitive to the light from the visible spectrum, an intensifying screen in said packet adjacent said film and having thereon a coating of fluorescent material, said film emulsion and fluorescent coating being so disposed that upon exposure to radiation such as would fog film contained within said package, the said coating will fluoresce thereby to expose said emulsion to visible light in addition to the effect thereon incidental to the normally invisible radiation itself.

WILLIAM A. WILLIAMS.

REFERENCES CITED

The following references are of record in the file of this patent:

UNITED STATES PATENTS

| Number | Name | Date |
| --- | --- | --- |
| 1,448,456 | Levy et al. | Mar. 13, 1923 |
| 1,698,058 | Martin | Jan. 8, 1929 |
| 2,126,769 | Goldschmidt | Aug. 16, 1938 |